United States Patent
Haegermarck

(10) Patent No.: US 10,045,675 B2
(45) Date of Patent: Aug. 14, 2018

(54) ROBOTIC VACUUM CLEANER WITH SIDE BRUSH MOVING IN SPIRAL PATTERN

(71) Applicant: Aktiebolaget Electrolux, Stockholm (SE)

(72) Inventor: Anders Haegermarck, Trångsund (SE)

(73) Assignee: Aktiebolaget Electrolux (SE)

( * ) Notice: Subject to any disclaimer, the term of this patent is extended or adjusted under 35 U.S.C. 154(b) by 0 days.

(21) Appl. No.: 15/101,212

(22) PCT Filed: Dec. 19, 2013

(86) PCT No.: PCT/EP2013/077378
§ 371 (c)(1),
(2) Date: Jun. 2, 2016

(87) PCT Pub. No.: WO2015/090398
PCT Pub. Date: Jun. 25, 2015

(65) Prior Publication Data
US 2016/0302638 A1    Oct. 20, 2016

(51) Int. Cl.
*A47L 11/40* (2006.01)
*A47L 11/24* (2006.01)
(Continued)

(52) U.S. Cl.
CPC ......... *A47L 11/4011* (2013.01); *A47L 9/0488* (2013.01); *A47L 11/24* (2013.01);
(Continued)

(58) Field of Classification Search
CPC .. A47L 11/4011; A47L 11/24; A47L 11/4038; A47L 2201/04; A47L 2201/06;
(Continued)

(56) References Cited

U.S. PATENT DOCUMENTS

| 1,286,321 A | 12/1918 | Hoover |
| 1,401,007 A | 12/1921 | Staples |

(Continued)

FOREIGN PATENT DOCUMENTS

| CA | 2154758 | 6/1995 |
| CN | 1116818 | 2/1996 |

(Continued)

OTHER PUBLICATIONS

"SM51 Series Opposed Mode Sensors, DC sensors with metal housings: SM51EB/RB, SM51EB6/RB6", Banner Engineering Corporation, pp. 1-24.

(Continued)

*Primary Examiner* — Dung Van Nugyen
(74) *Attorney, Agent, or Firm* — RatnerPrestia

(57) ABSTRACT

A robotic cleaning device having a main body, an opening in a bottom side of the main body for removing debris from an area to be cleaned, a brush adjacent to the opening and a propulsion system configured to move the robotic cleaning device across the area. The robotic cleaning device may further include a positioning system having an obstacle detecting device configured to detect obstacles and a processing unit. The obstacle detecting device is configured to record positional data, and the processing unit is configured to generate a cleaning pattern from the positional data, the cleaning pattern including at least one spiral pattern having an outer periphery. The spiral pattern is arranged so that the robotic cleaning device spirals inwards from the outer periphery towards a center of the spiral pattern, and the brush faces the outer periphery while the robotic cleaning device follows the spiral pattern.

12 Claims, 9 Drawing Sheets

(51) Int. Cl.
*G05D 1/02* (2006.01)
*A47L 9/04* (2006.01)

(52) U.S. Cl.
CPC ........ *A47L 11/4038* (2013.01); *G05D 1/0219* (2013.01); *G05D 1/0238* (2013.01); *G05D 1/0248* (2013.01); *A47L 2201/04* (2013.01); *A47L 2201/06* (2013.01); *G05D 2201/0215* (2013.01)

(58) Field of Classification Search
CPC .. G05D 1/0219; G05D 1/0238; G05D 4/2048; G05D 2201/0215
See application file for complete search history.

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | FereydounMaali |
| 5,353,224 A | 10/1994 | Lee |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | YuichiKawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |

(56) References Cited

U.S. PATENT DOCUMENTS

| | | |
|---|---|---|
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,053,578 B2 | 5/2006 | Diehl et al. |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck et al. |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DéFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |

(56) References Cited

U.S. PATENT DOCUMENTS

| | | |
|---|---|---|
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi et al. |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |

(56) References Cited

U.S. PATENT DOCUMENTS

| | | |
|---|---|---|
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steitz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,924,042 B2 | 12/2014 | Kim |
| 8,961,695 B2 | 2/2015 | Romanov |
| 8,985,127 B2 | 3/2015 | Konandreas |
| 9,033,079 B2 | 5/2015 | Shin |
| 9,037,396 B2 | 5/2015 | Pack |
| 9,144,361 B2 | 9/2015 | Landry |
| 9,360,300 B2 | 6/2016 | DiBernado |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |

(56) References Cited

U.S. PATENT DOCUMENTS

| | | |
|---|---|---|
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun et al. |
| 2007/0114975 A1 | 5/2007 | Cohen |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto et al. |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley et al. |
| 2009/0292393 A1 | 11/2009 | Casey |
| 2009/0292884 A1 | 11/2009 | Wang |
| 2009/0314318 A1 | 12/2009 | Chang |

(56) References Cited

U.S. PATENT DOCUMENTS

| | | |
|---|---|---|
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0131741 A1 | 6/2011 | Jones |
| 2011/0154589 A1 | 6/2011 | Reindle |
| 2011/0202175 A1* | 8/2011 | Romanov ............ A47L 11/4011 700/250 |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1* | 4/2013 | Yoon ..................... A47L 11/33 134/18 |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |

(56) References Cited

U.S. PATENT DOCUMENTS

| | | |
|---|---|---|
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung et al. |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1 | 1/2015 | Kim et al. |
| 2015/0039127 A1 | 2/2015 | Matsumoto |
| 2015/0057800 A1 | 2/2015 | Cohen |
| 2015/0197012 A1 | 7/2015 | Schnittman |
| 2015/0206015 A1 | 7/2015 | Ramalingam et al. |
| 2015/0265122 A1 | 9/2015 | Han et al. |
| 2016/0306359 A1 | 10/2016 | Lindhe |

FOREIGN PATENT DOCUMENTS

| | | |
|---|---|---|
| CN | 101297267 A | 10/2008 |
| CN | 102083352 A | 6/2011 |
| CN | 103027634 | 4/2013 |
| CN | 103054516 A | 4/2013 |
| DE | 3536907 | 4/1986 |
| DE | 9307500 | 7/1993 |
| DE | 4211789 | 10/1993 |
| DE | 4340367 | 6/1995 |
| DE | 19849978 | 5/2000 |
| DE | 102010000174 | 7/2011 |
| DE | 102010000573 | 9/2011 |
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 A2 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2296005 | 6/2011 |
| EP | 2251757 | 11/2011 |
| EP | 2417894 | 2/2012 |
| EP | 2438843 | 4/2012 |
| EP | 2466411 A2 | 6/2012 |
| EP | 2561787 | 2/2013 |
| EP | 2578125 | 4/2013 |
| EP | 2583609 | 4/2013 |
| EP | 2604163 | 6/2013 |
| EP | 2447800 | 4/2014 |
| EP | 2741483 | 6/2014 |
| EP | 2772815 | 9/2014 |
| EP | 2884364 A1 | 6/2015 |
| FR | 2999410 | 6/2014 |
| GB | 2355523 | 4/2001 |
| GB | 2382251 | 5/2003 |
| GB | 2494446 | 3/2013 |
| GB | 1447943 | 10/2013 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 A | 5/1988 |
| JP | 63181727 | 7/1988 |
| JP | 63241610 | 10/1988 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 A | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 B2 | 4/1995 |
| JP | 07129239 A | 5/1995 |
| JP | 07281742 | 10/1995 |
| JP | 08089455 | 4/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002182742 A | 6/2002 |
| JP | 2002287824 A | 10/2002 |
| JP | 2002355204 | 12/2002 |
| JP | 2002366228 | 12/2002 |
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005040597 A | 2/2005 |
| JP | 2005124753 A | 5/2005 |
| JP | 2005141636 A | 6/2005 |
| JP | 2006015113 A | 1/2006 |
| JP | 2006087507 | 4/2006 |
| JP | 2006185438 A | 7/2006 |
| JP | 2006231477 | 9/2006 |
| JP | 2006314669 | 11/2006 |
| JP | 2007014369 A | 1/2007 |
| JP | 2007070658 | 3/2007 |
| JP | 2007143645 A | 6/2007 |
| JP | 2007213236 A | 8/2007 |
| JP | 2007226322 A | 9/2007 |
| JP | 2007272665 A | 10/2007 |
| JP | 2008132299 A | 6/2008 |
| JP | 2008146617 A | 6/2008 |
| JP | 2008290184 | 12/2008 |
| JP | 2008543394 A | 12/2008 |
| JP | 2009509220 | 3/2009 |

(56) References Cited

FOREIGN PATENT DOCUMENTS

| | | |
|---|---|---|
| JP | 2009193240 A | 8/2009 |
| JP | 2010507169 A | 3/2010 |
| JP | 2010079869 A | 4/2010 |
| JP | 2010526594 | 8/2010 |
| JP | 2011045694 | 3/2011 |
| JP | 2011253361 A | 12/2011 |
| JP | 2012216051 A | 11/2012 |
| JP | 2013089256 A | 5/2013 |
| JP | 2014023930 A | 2/2014 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 A2 | 11/2001 |
| WO | 03022120 | 3/2003 |
| WO | 03024292 | 3/2003 |
| WO | 03026474 A2 | 4/2003 |
| WO | 2004006034 A2 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2015016580 | 2/2015 |

OTHER PUBLICATIONS

Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Chinese Application No. 20130075510.9, dated Feb. 6, 2017 with translation, 14pages.
Chinese Office Action for Chinese Application No. 201380075503.9, dated Feb. 13, 2017 with translation, 18 pages.
Chung etal.,"Path Planning for a Mobile Robot With Grid Type World Model", Proceedings of the 1992 IEEE/RSJ International Conference on Intelligent Robots and Systems,Jul. 7-10, 1992, pp. 439-444.
Collins, et al. "Cerebellar Control of a Line Following Robot", Computer Science and Electrical Engineering Department, University of Queensland, St.Lucia, Queensland, 4072 A, pp. 1-6.
Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series—Research Triangle Park—Raleigh, NC, Oct. 22-24, 1993, pp. 1-6.
Everett, Sensors for Mobile Robots Theory and Application, A.K. Peters, 1995, Chapters 1 and 3, 70pages.
Everett, Sensors for Mobile Robots Theory and Application, A.K. Peters, Ltd., 1995, Chapters 15 and 16, 59pages.
Everett, Sensors for Mobile Robots Theory and Application, A.K. Peters, Ltd., 1995, Chapters 6, 7 and 10, 79pages.
Everett, Sensors for Mobile Robots Theory and Application, A.K. Peters, Ltd., 1995, Chapters, 4a nd 5, 68pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9pages.
Final Office Action for U.S. Appl. No. 15/100,667, dated Apr. 21, 2017, 26 pages.
Gavrilut, et al., "Wall-Following Method for an Autonomous Mobile Robot using Two IR Sensors", 12th WSEAS International Conference on Systems, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.
Interational Search Report and Written Opinion of the International Searching Authority for International Application No. PCT/EP2014/077549, dated Jul. 27, 2015, 9 pages.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authority fo rInternatonal Applicaion No. PCT/EP2014/0077142, dated Sep. 11, 2015, 8 pages.
International Search Report and Written Opinion of the International Searching Authority for International Application No. PCT/EP2014/069073, dated May 12, 2015, 10pages.
International Search Report and Written Opinion of the International Searching Authority for International Application No. PCT/EP2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.

(56) References Cited

OTHER PUBLICATIONS

International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19pages.
International Search Report and Written Opinion of the International Searching Authority for International Application No. PCT/EP2014/078144, 7 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5pages.
International Search Report for International Application No. PCT/EP2013/057815 dated Apr. 12, 2014, 4 pages.
International Search Report for International Application No. PCT/EP2013/067500 dated Dec. 2013, 4pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref,etal."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61pages.
Non Final Office Action for U.S. Appl. No. 15/100,667, dated Sep. 12, 2016, 24 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Notice of Allowance for U.S. Appl. No. 14/409,291, dated Jun. 16, 2016, 13 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
Non Final Office Action for U.S. Appl. No. 15/102,015, dated Aug. 17, 2017, 13 pages.
International Search Report and Written Opinion of the International Searching Authority for International Application No. PCT/EP2015/058377, dated Aug. 10, 2016, 15 pages.
Final Office Action for U.S. Appl. No. 14/409,291, dated Jun. 6, 2017, 21 pages.
Japanese Office Action forApplication for Japanese Application No. 2015-528969, dated Apr. 7, 2017 with translation, 4 pages.
Notice of Allowance for U.S. Appl. No. 15/101,257, dated Jul. 6, 2017, 9 pages.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 14/784,106, dated Oct. 19, 2017, 11 pages.
Notice of Allowance for U.S. Appl. No. 15/102,015, dated Dec. 11, 2017, 8 pages.
Notice of Reasons for Rejection for Japanese Application No. 2016-526764, dated Aug. 25, 2017 with translation, 6 paes.
Notification fo Reasons for Rejection for Japanese Application No. 2016-526765, dated Aug. 25, 2017 with translation, 7 pages.
Notifcation of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.
Notice of Allowance for U.S. Appl. No. 14/409,291, dated Sep. 18, 2017, 8 pages.
European Communication Pursuant to Article 94(3) for European Application No. 13817911.4, dated Jan. 15, 2018, 8 pages.
Non Final Office Action for U.S. Appl. No. 15/102,017, dated Feb. 16, 2018, 12 pages.
Chinese Office Action for Chinese Application No. 201380075503.9, dated Nov. 8, 2017 with translation, 16 pages.
European Communication Pursuant to Article 94(3) for European Application No. 16176479.0, dated Nov. 27, 2017, 6 pages.
International Search Report and Written Opinion for International Application No. PCT/EP2015/070140, dated May 27, 2016, 11 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notification of Reasons for Refusal for Japanese Application No. 2016-526947, dated Sep. 21, 2017 with translation, 8 pages.
Notification of Reasons for Refusal for Japanese Application No. 2017-501374, dated Mar. 6, 2018 with translation, 8 pages.
Chinese Office Action for Chinese Application No. 201380081535.X, dated Mar. 26, 2018 with translation, 18 pages.
Chinese Office Action for Chinese Application No. 201380081103.9, dated Feb. 27, 2018 with translation, 19 pages.
Non Final Office Action for U.S. Appl. No. 15/101,515, dated Apr. 18, 2018, 14 pages.

(56) References Cited

OTHER PUBLICATIONS

Final Office Action for U.S. Appl. No. 14/784,106, dated Mar. 28, 2018, 8 pages.
Final Office Action for U.S. Appl. No. 15/100,667, dated Mar. 27, 2018, 23 pages.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.
Final Office Action for U.S. Appl. No. 15/102,107, dated Jun. 14, 2018, 12 pages.
Non Final Office Action for U.S. Appl. No. 15/101,235, dated Jun. 14, 2018, 11 pages.

\* cited by examiner

ROBOTIC VACUUM CLEANER WITH SIDE BRUSH MOVING IN SPIRAL PATTERN

This application is a U.S. National Phase application of PCT International Application No. PCT/EP2013/077378, filed Dec. 19, 2013, which is incorporated by reference herein.

TECHNICAL FIELD

The invention relates to a robotic vacuum cleaner and to a method of operating the robotic vacuum cleaner so that no debris remains on a surface or area to be cleaned after the cleaning.

BACKGROUND

Robotic vacuum cleaners are known in the art. In general robotic vacuum cleaners are equipped with drive means in the form of a motor for moving the cleaner across a surface to be cleaned. The robotic vacuum cleaners are further equipped with intelligence in the form of microprocessor(s) and navigation and positioning means for causing an autonomous behaviour such that the robotic vacuum cleaners can freely move around and clean a space in the form of e.g. a room.

In many fields of technology, it is desirable to use robots with an autonomous behaviour such that they freely can move around a space without colliding with possible obstacles.

As an a example, robotic vacuum cleaners exist in the art with the capability of more or less autonomously vacuum cleaning a room in which furniture such as tables and chairs and other obstacles such as walls and stairs are located.

Traditionally, these robotic vacuum cleaners have navigated a room by means of using e.g. ultrasound or light waves or laser beams. Such robotic vacuum cleaners usually clean an area or surface by means of parallel strokes or stripes back and forth.

Traditionally, robotic vacuum cleaners have been arranged with circular-shaped main bodies. Such a robot having co-axial drive wheels at the centre of its body has the advantage that it is easy to control and cannot get stuck since it always can rotate 180° and go back the same way it came. However, the circular-shaped main body makes them unsuitable for cleaning corners or edges where a floor meets a wall since these circular vacuum cleaners due to their shape cannot move into a corner or close enough to a wall, or other objects around which cleaning is required such as e.g. chair legs. An example of a robotic vacuum cleaner aiming at solving this problem is disclosed in WO 03/024292, the main body of which at its rear end is circular-shaped, whereas the front end of the main body is substantially rectangular. This is an improvement over the traditional circular-shaped robotic vacuum cleaners in terms of reaching into corners. Further, sweeping brushes are arranged at a bottom side of the main body and disposed such that they are associated with front corner regions of the rectangular-shaped main body front end.

Sweeping, rotating or even steady brushes may further be arranged eccentrically to an opening in the bottom of the main body. The opening may comprise a nozzle or the like to enhance the ability of the robotic vacuum cleaner to reach out into corners and edges and, in some cases, to extend the range or width of the effective cleaning. The brushes may be positioned on the body of the robotic vacuum cleaner similar to the rotating brushes of a machine that is configured to clean streets and other public areas.

In many cases only one brush is arranged on the body of the robotic vacuum cleaner. When the brush is arranged eccentrically or offset of the opening, either on a left or right side thereof, the cleaning movement of the robotic vacuum cleaner should be adapted accordingly. When a stroke or stripe pattern, in which the robotic vacuum cleaner is moving back and forth from stroke to stroke, is used as a cleaning pattern, debris may be pushed off the actual cleaning pattern and thus the cleaning process may not be proper and neat and may leave some debris behind.

For the reasons above there is a need for good planning of the cleaning process and thus the cleaning pattern that is followed by the robotic vacuum cleaner.

SUMMARY

An object of the invention is to provide a robotic cleaning device which provides a neat and effective cleaning.

A further object of the invention is to provide a robotic cleaning device, which is easy to handle and independent.

Another object of the invention is to provide a method of cleaning with a robotic cleaning device, which improves the result of the cleaning process.

The above mentioned objects are solved by a robotic cleaning device and by a method of operating a robotic cleaning device, as claimed in the independent claims.

Disclosed herein is a robotic cleaning device comprising a main body, an opening arranged in a bottom side of the main body for removing debris from an area to be cleaned, a brush arranged adjacent to the opening and at least one driving wheel. The robotic cleaning device may further comprise a propulsion system configured to move the robotic cleaning device across the area, and a positioning system comprising an obstacle detecting device and a processing unit. The processing unit being arranged to control the driving motor to move across the area to be cleaned, the positioning system may be configured to record positional data for example via the obstacle detecting device, whereby the processing unit is configured to generate a cleaning pattern from said positional data. The cleaning pattern may comprise at least one spiral pattern having an outer periphery, said spiral pattern may be arranged so that, during the cleaning, the robotic cleaning device spirals itself inwards from the outer periphery towards a centre of the spiral pattern. The brush may be arranged to face the outer periphery, while the robotic cleaning device follows the spiral pattern.

The obstacle detecting device may be in the form of a 3D sensor system, which 3D sensor system may be a laser scanner, a camera in combination with line lasers, a radar, etc.

The 3D sensor system may comprise a camera device configured to record images of a vicinity of the robotic cleaning device and a first and second vertical line lasers arranged to illuminate said vicinity of the robotic cleaning device. The processing unit may be configured to derive the positional data from the recorded images.

The positional data may comprise position information of the robotic cleaning device itself and/or mapping information derived from the area to be cleaned. The positional data may be a map, a layout or a floor plan of parts or all of the area to be cleaned.

The term spiral pattern used herein is to be understood in the broadest possible sense and not limited to a continuous curve around a centre point or to the mathematical definition of the term spiral. The spiral pattern may have any shape from circular to elliptical, quadratic, rectangular, or any combinations of these shapes, as partially illustrated in the figures.

The brush is arranged so that it is always on an outer side as seen in the direction of movement of the robotic cleaning device and in relation to the centre of the spiral pattern.

When the robotic cleaning device is following such a cleaning pattern, which it defined itself via the processing unit and the positioning system based on the positional data, the area to be cleaned is cleaned in the best possible manner leaving almost no debris behind. The cleaning pattern and the spiral pattern, respectively, which is followed by the robotic cleaning device, may ensure a neat and tidy cleaning of the area to be cleaned. Such a cleaning process may further enhance efficiency since the robotic cleaning device is planning the cleaning process properly and false moves or inefficiencies, such as double cleaning of regions or overlapping strokes, may be reduced to a minimum.

The robotic cleaning device may be a robotic vacuum cleaner or a robotic floor mop or the like.

In an embodiment the brush may be a rotating brush, which is arranged at a periphery of the body and which extends at least partially outside a periphery of the body.

A rotating brush has the advantage of an effective cleaning. The positioning of the rotating brush so that it at least extends partially outside a periphery of the body may enable the rotating brush to reach into corners and edges.

It may be possible to mount two rotating brushes laterally positioned on either side of the opening, this is however not necessary to achieve a neat and tidy cleaning. However, such an embodiment may extend the range or cleaning width of the opening.

In an embodiment the positional data is recorded, by the positioning system and the processing unit, while the robotic vacuum cleaner is following a boundary of the area to be cleaned.

The positioning system may additionally comprise one or two vertical line lasers to illuminate an angle of vision of the camera device.

The robotic cleaning device is thus configured to work autonomous from the beginning. It gets to know its surroundings or environment by way of moving in it and by way of recording images and extracting characteristics from said images.

The 3D sensor system may further be embodied in the form of a proximity sensor or the like such as infrared (IR) sensors and/or sonar sensors, a microwave radar, a camera device registering its surroundings via the aid of line lasers, a laser scanner, etc. for detecting obstacles and communicating information about any detected obstacle to the processing unit.

The processing unit communicates with the propulsion system to control movement of the robotic cleaning device in accordance with information provided by the obstacle detecting device and the positioning system, respectively, such that the robotic cleaning device can move as desired across the area to be cleaned.

Alternatively a user may show or teach the robotic cleaning device its surroundings, whereby the robotic cleaning device may record and store a positional data accordingly.

Advantageously, the rotating brush is rotating in the same direction as the spiral pattern.

This ensures that no debris is pushed off the cleaning pattern or the range of cleaning of the robotic cleaning device.

In case the spiral pattern is a left-hand spiral pattern, the rotating brush may rotate counter clockwise or, in case the spiral pattern is a right-hand spiral pattern, the rotating brush may rotate clockwise.

The brush may be arranged on a horizontally protruding portion of the body.

This may extend the cleaning range of the robotic vacuum cleaner and improve the ability of the latter to reach into edges and corners.

The spiral pattern may comprise an angular shaped spiral pattern.

The robotic cleaning device is configured to adapt its cleaning pattern on the positional data and thus the layout of the area or room to be cleaned. In some cases the room may be rectangular and in other cases the room may be circular or comprise at least one circular wall.

The spiral pattern may be adapted accordingly and it may thus comprise an angular shaped spiral pattern or a circular- or even oval-shaped spiral pattern, depending on the positional data and/or layout of the area or room to be cleaned.

In an embodiment the brush may be arranged on a right side of the opening as seen in a direction of movement of the robotic vacuum cleaner and the spiral pattern may be a left-hand spiral pattern.

Alternatively, in a further embodiment of the invention the brush may be arranged on a left side of the opening as seen in a direction of movement of the robotic vacuum cleaner and the spiral pattern may be a right-hand spiral pattern.

Thus the brush is always arranged on an outer side as long as the robotic vacuum cleaning device is following the spiral pattern.

The cleaning pattern may comprise a plurality of spiral patterns.

In case the area to be cleaned is a complex area with a lot of edges and corners or with obstacles such as tables or sofas, the robotic cleaning device may be configured to adapt the cleaning pattern accordingly.

The processing unit may be configured to divide or split the cleaning pattern based on the positional data, in a plurality of spiral patterns to provide a good cleaning of the area.

The cleaning pattern may comprise communication paths, which interconnect the plurality of spiral patterns.

The communication paths may ensure that the cleaning pattern is complete and completely covers the area to be cleaned.

Disclosed herein is further a method of operating a robotic cleaning device comprising the steps of generating positional data of an area to be cleaned from images taken by a camera device, defining a cleaning pattern from the generated positional data by a processing unit, said cleaning pattern defining at least one spiral pattern to be followed by the robotic cleaning device. The method may further comprise the step of moving the robotic cleaning device along the spiral pattern, said movement being controlled by the processing unit, so that a side brush of the robotic vacuum cleaner is facing an outer periphery of the spiral pattern, while the robotic cleaning device is moving along said spiral pattern.

Such a method may ensure a neat and tidy cleaning process within the area to be cleaned.

Advantageously the method may further comprise the step of generating positional data by having the robotic cleaning device autonomously following a periphery of the area.

This step may ease up the installation procedure of the robotic cleaning device for the user. The user can position the robotic cleaning device on the floor, preferably in the area to be cleaned and the robotic cleaning device then starts the initial cleaning process by autonomously creating the positional data.

In an embodiment the method may further comprise the step of splitting the cleaning pattern based on the positional data, such a split cleaning pattern comprising at least two spiral patterns.

This may enable to improve the cleaning method by adapting it to the layout of the area or room to be cleaned.

In an advantageous embodiment the method may further comprise the additional step of recognizing obstacles within the area, recording said obstacles and placing them in the positional data and defining a cleaning pattern based on the generated positional data comprising the recorded obstacles.

Thus the obstacles, which are preferably fixed obstacles, may be recorded and considered in the cleaning method. This may further enhance the quality of the cleaning process.

The cleaning pattern may be defined in many possible ways, thus for one and the same layout of an area or room, the cleaning pattern may vary depending on the judgment of the robotic cleaning device.

As an example, the cleaning pattern may comprise one single spiral pattern that covers the area of two adjacent rooms or on the other hand the cleaning pattern for the same two adjacent rooms may comprise two spiral patterns, one for each room, with a communication path that interconnects the two spiral patterns.

It is noted that the invention relates to all possible combinations of features recited in the claims. Further features of, and advantageous with the present invention will become apparent when studying the appended claims and the following description. Those skilled in the art realize that different features of the present invention can be combined to create embodiments other than those described in the following.

The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
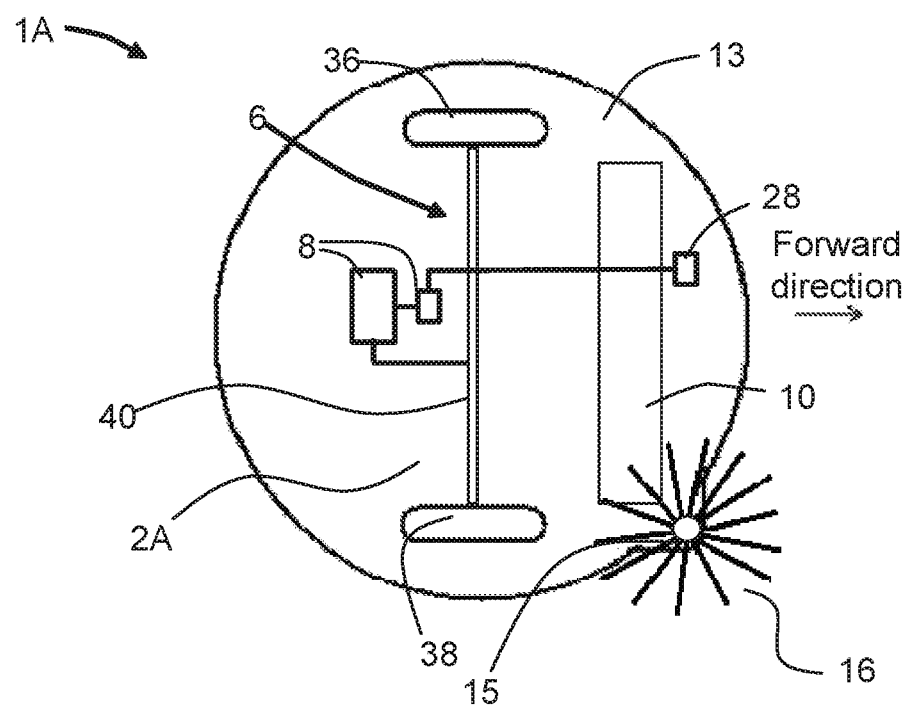
FIG. 1 schematically illustrates a bottom view of an embodiment of a robotic cleaning device according to the invention comprising a brush.
Figure 2:
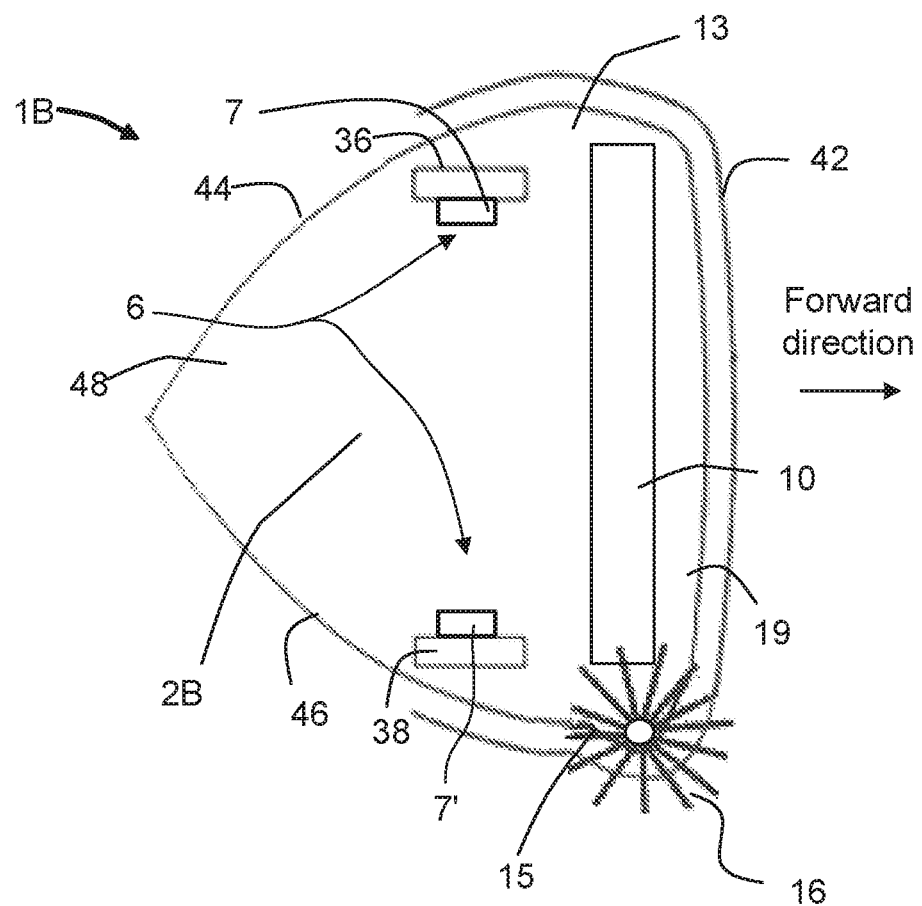
FIG. 2 schematically illustrates a bottom view of another embodiment of a robotic cleaning device according to the invention.
Figure 3:
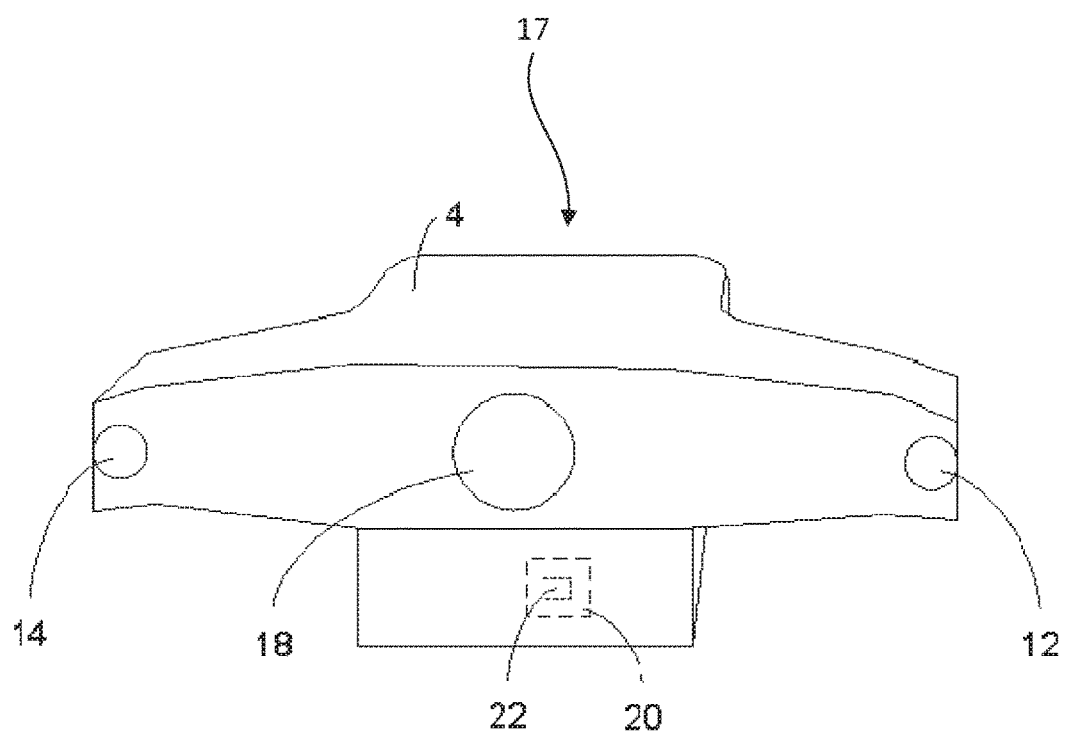
FIG. 3 schematically illustrates a perspective view positioning system of a robotic cleaning device according to the invention.

Referring now to the figures, which show illustratively embodiments and examples according to the invention, the robotic cleaning device 1A, 1B comprises a main body 2A, 2B and a positioning system 4, as best illustrated in FIGS. 1 to 3. FIG. 1 shows a bottom view of the robotic cleaning device 1. The robotic cleaning device 1A, 1B may further comprise a propulsion system 6 comprising drives 8, 7, 7' and an opening 10 also connected to the main body 2A, 2B. The main body 2A, 2B may comprise a front portion 13, a right side wall 44, a left side wall 46 and a rear end portion 48.

The propulsion system 6 may embodied comprising driving wheels as illustrated in the figures, or it may be a propulsion system comprising crawlers in combination with a drive 8, 7, 7' or a hovercraft system.

The opening 10 may be part of a cleaning member of the robotic cleaning device 1A, 1B, said cleaning member further comprising a suction fan or the like connected to the opening 10.

The positioning system 4 may comprise an obstacle detecting device comprising a 3D sensor system 17, a first vertical line laser 12 and a second vertical line laser 14. The 3D sensor system 17 may comprise a camera device 18 and a first and second vertical line lasers 12, 14. The positioning system 4 may further comprise a processing unit 20, as best illustrated in FIG. 3. The processing unit 20 may be electrically connected to the 3D sensor system 17, the drives 8, 7, 7' and the first—and second vertical line lasers 12, 14 as shown in FIGS. 1 and 3.

FIG. 3 illustrates the processing unit 20 comprising a storage unit 22 such as a solid state drive (SSD) or the like, on which storage unit 22 information may be stored such as images taken by the camera device 18, positional data and cleaning patterns 26A, 26B, 26C, 26D, 26E, 26F of an area 28A, 28B, 28C, 28D, 28E, 28F to be cleaned, the position of a charging device, etc. Since the processing unit 20 may be configured to extract data from the images, the size of the storage unit 22 may be comparably small.

As illustrated in FIG. 1, the processing unit 20 may be a control unit configured to control the drive 8 and thus the propulsion system 6 in order to move the robotic cleaning device across the area 28A, 28B, 28C, 28D, 28E, 28F to be cleaned. The propulsion system 6 may comprise a drive shaft 40 and two coaxial driving wheels 36, 38, arranged on the two ends of the drive shaft 40. The robotic cleaning device 1A may additionally comprise a rotatable stabilizer wheel (not shown) arranged in the rear end portion 48 of the robotic cleaning device 1A or rotatable opening 10 wheels (not shown) arranged laterally of the opening 10, however such stabilizer—or opening wheels are not necessary.

On the main body 2A there is a brush 16, preferably a rotating brush 16, arranged on a protruding portion 15. In the embodiments illustrated in FIGS. 1 and 2 the brush 16 or rotating brush 16 is arranged on a right side of the opening 10, as seen in a direction of forward movement of the robotic cleaning device 1. A forward movement would be a movement where the front end portion 13 is positioned ahead or straight forward. For reasons of simplicity the term brush 16 will be used hereinafter, including all possible brush types, such as sweeping brushes, rotating brushes, etc.

The brush 16 is positioned on the protruding member 15 so that it extends over the periphery of the main body 2A. This may ensure that the brush 16 can reach into corners and edges without being limited by the exterior periphery of the main body 2A of the robotic cleaning device 1A, 1B and further extends the range of the robotic cleaning device 1.

It falls within the scope of the invention to position the brush 16 on the left side of the opening 10 or even have two brushes on either lateral and thus left or right side of the opening 10. It also falls within the scope of the invention to install two brushes 16, namely on the left and the right side of the opening 10, on the robotic cleaning device 1.

When the robotic cleaning device 1A, 1B comprises only one brush 16, the cleaning pattern 26A, 26B, 26C, 26D, 26E, 26F has to be adapted, since a simple stroke by stroke movement of the robotic cleaning device 1A, 1B may result in pushing some of the debris off the cleaning pattern 26A, 26B, 26C, 26D, 26E, 26F, which may result in a cleaning that is not neat and tidy. FIGS. 4 to 7 illustrate various cleaning patterns 26A, 26B, 26C, 26D, 26E, 26F which may avoid pushing debris off the cleaning pattern 26A, 26B, 26C, 26D, 26E, 26F, when the brush 16 is arranged on the right side of the opening 10. FIGS. 4 to 8 will be explained in more detail later herein.

The robotic cleaning device 1A illustrated in FIG. 1 has a round, circular shape or periphery. Such a robotic cleaning device having coaxial drive wheels more or less in the middle of its main body 2A, has the advantage that it is easy to control and cannot get stuck since it can always rotate 180° and go back the same way it came. However, the circular-shaped main body 2A may make circular robotic cleaning devices unsuitable for cleaning corners or edges where a floor meets a wall since these circular robotic cleaning devices may not be able to move into corners or close enough to a wall due to their shape. The present invention may however also be implemented in a circular shaped robotic cleaning device 1.

The FIG. 2 illustrates a robotic cleaning device 1B that has a different shape from the robotic cleaning device 1B as shown in FIG. 1. The main body 2B of this robotic cleaning device has a front end portion 13 with a front end periphery 19, a rear end portion 48, a right side periphery 44 connecting the front end periphery 19 and the rear end portion 48 and a left side periphery 46 connecting the front end periphery 19 and the rear end portion 48. The front end portion 13 of the main body 2B of the robotic cleaning device 1B is the portion of the main body 2B located between driving wheels 36, 38 and a front end periphery 19. In an embodiment of the present invention, the front end portion 13 is essentially quadrilateral-shaped, possibly with slightly rounded corners where the front end periphery 19 meets the right side periphery 44 and the left side periphery 46, respectively. The front end periphery 19 is flat/straight or slightly curved as shown in FIG. 2 in order to reach far into corners. As previously mentioned, the rotating brush 16 arranged on the protruding portion 15 is advantageous for increasing the reach or range of the robotic cleaning device 1B.

The front end portion 13 may additionally comprise a bumper 42. The bumper 42 may be configured to be replaceable. The brush 16 is configured and positioned on the protruding member 15 so that it extends over the periphery of the bumper 42.

The propulsion system 6 of the robotic cleaning device as illustrated in FIG. 2 may comprise two independent drives 7, 7' for each driving wheel 36, 38. The drives 7, 7' may comprise a gear box and suspension for each driving wheel 36, 38.

FIG. 3 schematically illustrates the positioning system 4 with the 3D sensor system 17 comprising the first- and second vertical line lasers 12, 14 the camera device 18 and the processing unit 20. The processing unit 20 may have the storage unit 22 integrated. All components of the positioning system 4 are illustrated to be embedded in a housing or tower portion. The positioning system 4 may be rotatably or fixedly mounted on the main body 2A, 2B. The storage unit 22 may be configured to store images taken by the camera device 18 or camera device, characteristics derived from said images, positioning information and cleaning pattern 26 information related to the cleaning pattern 26 that needs to be followed.

Alternatively to the solution shown in FIG. 3, the 3D sensor system 17 and the obstacle detecting device, respectively, is separated from the main body 2A, 2B of the robotic cleaning device 1A, 1B. However, in a practical implementation, the 3D sensor system 17 is likely to be integrated with the main body 2A, 2B of the robotic cleaning device 1A, 1B to minimize the height of the robotic cleaning device 1A, 1B, thereby allowing it to pass under obstacles, such as e.g. a sofa.

Turning now to FIGS. 4 to 7, which illustrate exemplary cleaning patterns 26 developed by a method and the robotic cleaning device 1A, 1B according to the invention. Said cleaning patterns are based on the recorded or created positional data.

Figure 4:
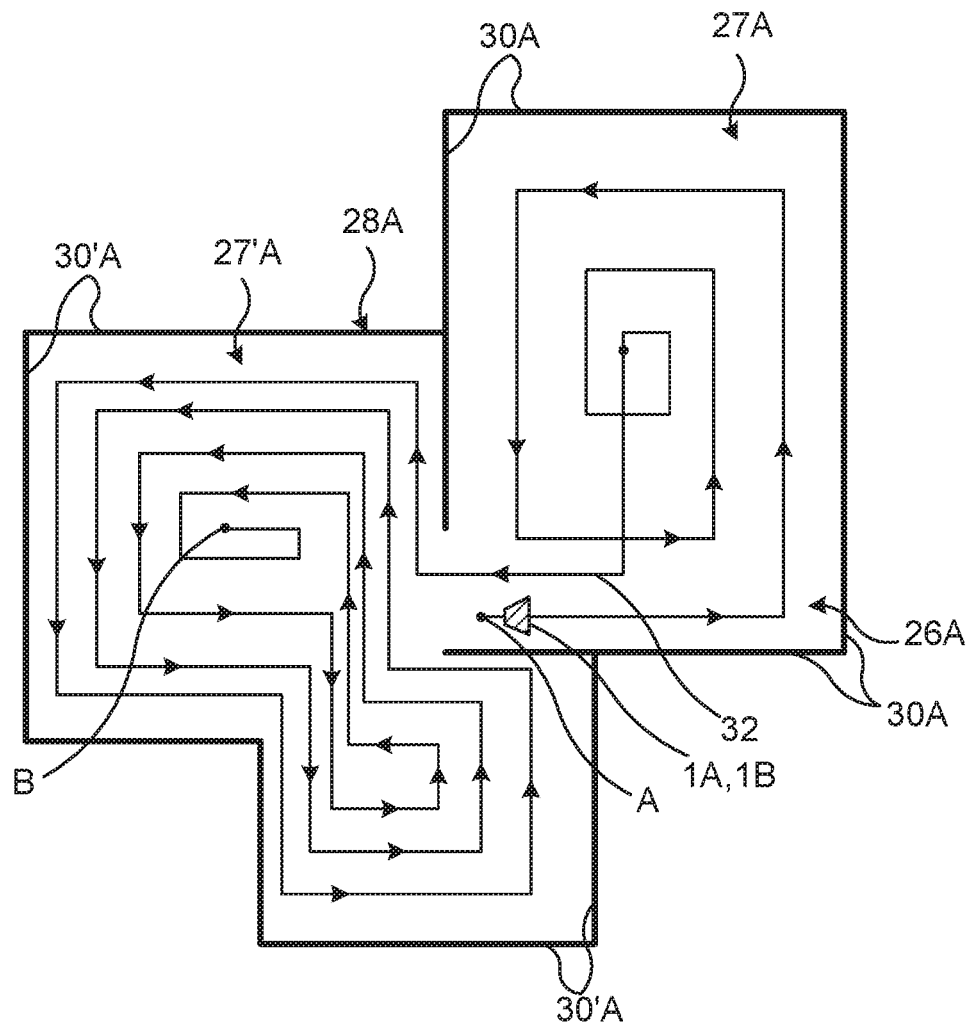
FIG. 4 schematically illustrates top down view on an area to be cleaned comprising two rooms and a corresponding cleaning pattern defined by the robotic cleaning device and a method according to an embodiment of the invention.

FIG. 4 illustrates a two room area 28A, whereby the two rooms are interconnected via a door. The robotic cleaning device 1A, 1B is configured to firstly learn the layout and it may be configured to create a map of the area 28A that it is supposed to clean out of the positional data. This may be done by following a periphery of the area 28A and then generate positional data for example in the form of a map. Alternatively this may be done by positioning the robotic cleaning device 1A, 1B centrally in the area 28A and then by the positioning system 4 rotating, recording and storing area 28A information. Out of the stored positional data the processing unit 20 may be configured to produce a map, a layout or a floor plan. From the map, layout or floor plan, the processing unit 20 may derive and generate the cleaning pattern 26A, which cleaning pattern 26A may comprise at least one spiral pattern 27A, 27'A. In the example shown in FIG. 4, the cleaning pattern 26A comprises two spiral patterns 27A, 27'A, which are interconnected by a communication path 32. The communication path 32 is basically the only stroke or region that the robotic cleaning device 1A, 1B cleans two times. As previously mentioned, the cleaning pattern 26A shown in FIG. 4 is designed for a robotic vacuum cleaner having a rotating brush 16 arranged on the right side of the opening 10, said rotating brush 16 rotating counter clock-wise.

From the cleaning pattern 26A illustrated in FIG. 4 it becomes clear that no debris will be pushed off the cleaning pattern. Each spiral pattern 27A, 27'A comprises an outer periphery 30A, which may be defined by the processing unit 20 taking into account the recorded positional data of the area 28A, whereby the robotic cleaning device 1A, 1B or robotic vacuum cleaner will start the cleaning process by following the outer periphery 30A of a first spiral 27A and then move or spiral itself towards a centre of the spiral pattern 27A, 27'A. In the shown example in FIG. 4, the spiral patterns 27A, 27'A are left-hand spiral patterns. The robotic cleaning device 1A, 1B may begin the cleaning process at a starting point A arranged on the first spiral pattern 27A, close to or at the boundary of the area 28A to be cleaned. The second spiral pattern 27'A is used to cover a room comprising two rectangular room boundaries or margins. The robotic vacuum cleaner may be designed to cover this specific room either by one single second spiral pattern 27'A as shown in FIG. 4 or by dividing this room up and by using two spiral patterns (not shown) for this room.

The processing unit 20 is programmed and configured to decide itself whether a specific room should be divided or split into a plurality of spiral patterns 27A, 27'A, 27B, 27'B, 27C, 27'C, 27D, 27'D, 27E, 27'E, 27F, 27'F, 27"F. This may depend on the size and/or geometrical shape of the room or area 28A, 28B, 28C, 28D, 28E, 28F to be cleaned. When the robotic cleaning device 1A, 1B is finished with the cleaning pattern 26A, 26B, 26C, 26D, 26E, 26F, thus when it arrived on the centre B of the second spiral pattern 27'A, 27'B, 27'C, 27'D, 27'E, 27F, 27'F, 27"F, which is an end point B of the cleaning process, it may go back to a charging station or the like (not shown).

Figure 5:
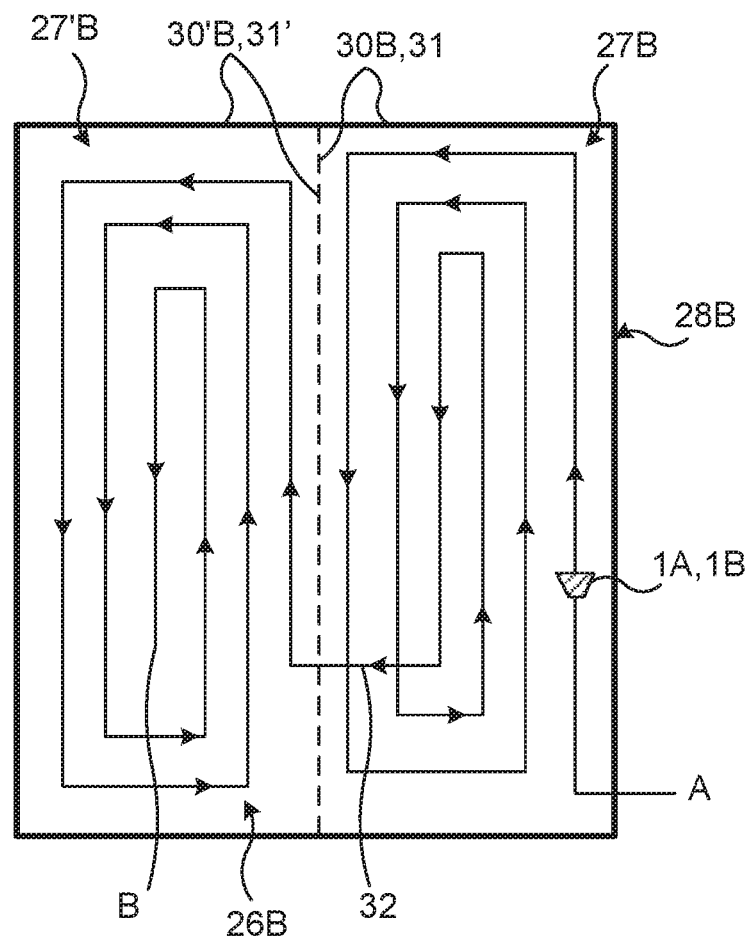
FIG. 5 schematically illustrates a top down view on a comparably big area or room to be cleaned with a cleaning pattern that is divided or split up in two spiral patterns by the robotic cleaning device and the method according to an embodiment of the invention.

FIG. 5 illustrates a comparably big room or area 28B to be cleaned, whereby the processing unit 20 decided to split up the area 28B into two sub-areas 31, 31', whereby the sub-areas 31, 31' form the peripheries of the two spiral patterns 27B, 27'B of the cleaning pattern 26B, which spiral patterns 27B, 27'B are used to cover the area 28B to be cleaned. The dashed line going through the middle of the area 28B illustrates an imaginary boundary between the two spiral patterns 27B, 27'B, said boundary being generated by the processing unit 20 based on the recorded room or area information and the positional data, respectively.

The robotic cleaning device 1A, 1B may begin the cleaning process in a corner of the area 28B to be cleaned and end the cleaning at the centre of the second spiral pattern 27'B, said corner illustrated as the start point A and the centre illustrated as the end point B, in FIG. 5. Again the spiral patterns 27B, 27'B are interconnected by a communication path 32, which is part of the cleaning pattern 26B.

Figure 6A:
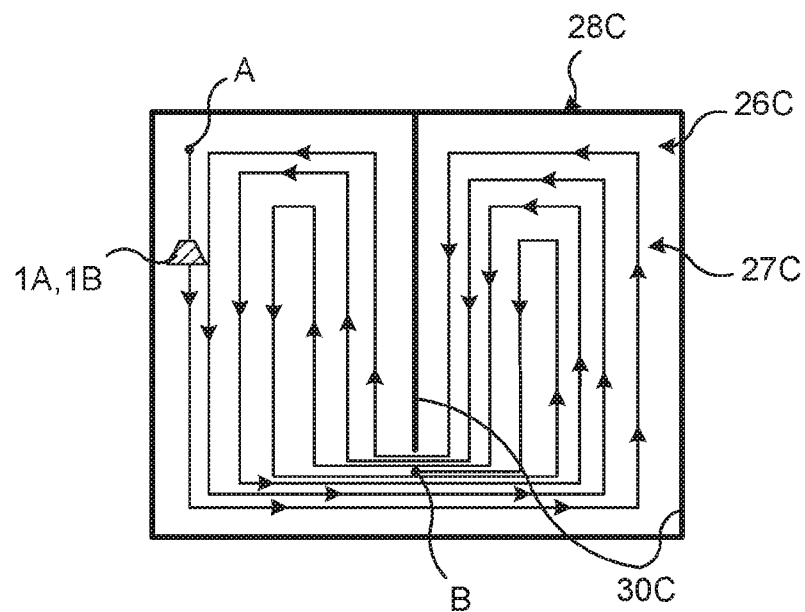
FIG. 6a schematically illustrates a top down view on an area to be cleaned comprising two rooms and a cleaning pattern adapted accordingly by the robotic cleaning device and the method according to an embodiment of the invention.

FIG. 6a illustrates a similar area 28C as FIG. 5 but with a middle wall which is separating two rooms. The cleaning pattern 26C comprises one single spiral pattern 27C that extends over or across the two rooms. The start point A is chosen to be in a corner of the area 28C and the end point B is located in between the two rooms in a pathway that is interconnecting the two rooms. By defining a spiral pattern 27C as shown in FIG. 6a, the pathway interconnecting the rooms may be cleaned several times; it may however still be easier for the processing unit 20 to define one single spiral pattern 27C.

Figure 6B:
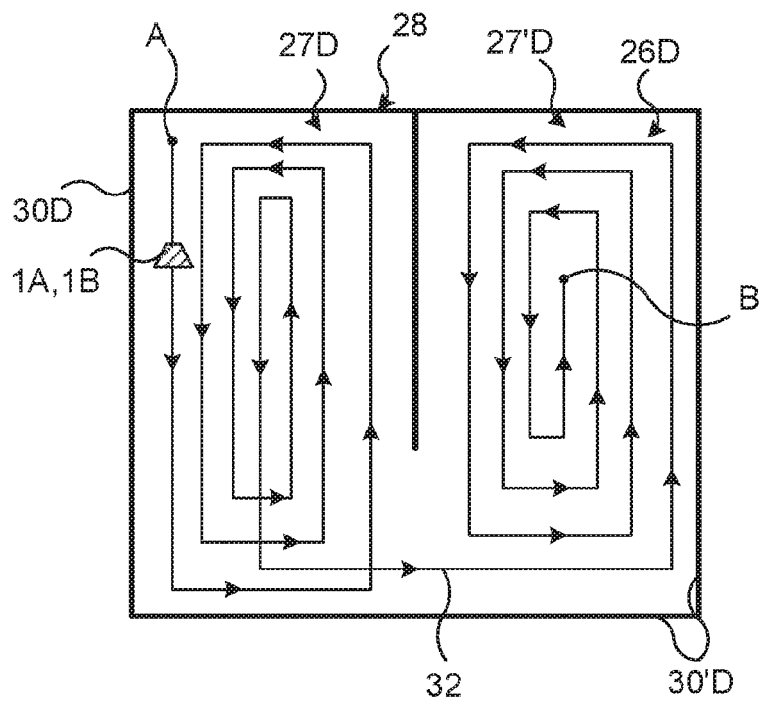
FIG. 6b schematically illustrates a top down view on the same area to be cleaned as shown in FIG. 6a but with a cleaning pattern comprising two spiral patterns configured to be cleaned by the robotic cleaning device and the method according to an embodiment of the invention.

As an alternative, the area 28C shown in FIG. 6a may be cleaned via a cleaning pattern 26D comprising two spiral patterns 27D, 27'D as shown in FIG. 6b (same area 28C), which are interconnected by the communication path 32. Each spiral pattern 27D, 27'D may in such a case be configured to cover one of the two rooms shown in FIG. 6a and FIG. 6b. The robotic cleaning device 1A, 1B will begin the cleaning process starting from the periphery of the first spiral patterns 27D and therefrom moving inwards towards the centre of the second spiral pattern 27'D. In FIG. 6b the outer peripheries 30D, 30'D of first and second spiral patterns 27D, 27'D are also illustrated.

The brush 16 is arranged to face the outer periphery 30A, 30'A, 30B, 30'B 30C, 30'C, 30D, 30'D, 30E, 30'E of the spiral pattern 27A, 27'A, 27B, 27'B, 27C, 27'C, 27D, 27'D, 27E, 27'E, 27F, 27'F, 27"F as long as the robotic cleaning device 1A, 1B is following the spiral pattern 27A, 27'A, 27B, 27'B, 27C, 27'C, 27D, 27'D, 27E, 27'E, 27F, 27'F, 27"F. The brush 16 is thus always arranged on an outer side of the main body 2A, 2B when the robotic cleaning device 1A, 1B is following the spiral pattern 27A, 27'A, 27B, 27'B, 27'C, 27D, 27'D, 27E, 27'E, 27F, 27'F, 27"F.

The processing unit 20 may be configured to decide itself how the cleaning pattern 26A, 26B, 26C, 26D, 26E, 26F should be derived from the positional data and thus how the cleaning pattern 26A, 26B, 26C, 26D, 26E, 26F should be split or divided in order to achieve the best cleaning results. The processing unit 20 may thus comprise a decision module or the like (not shown), which may be a microcontroller or processor in itself.

Figure 7:
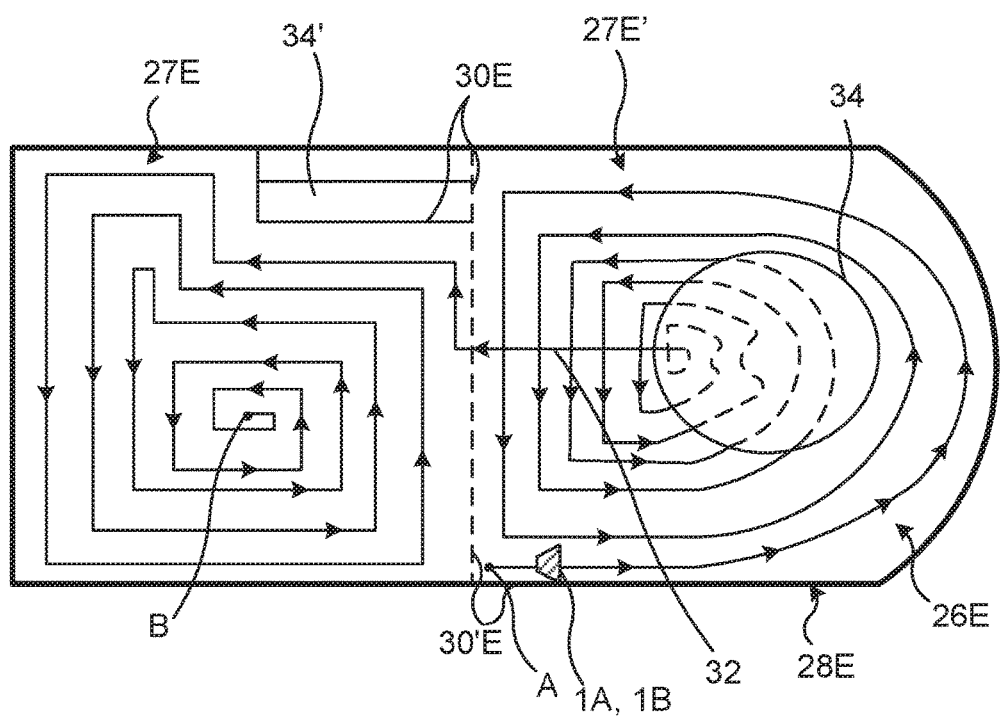
FIG. 7 schematically illustrates a top down view on another exemplary area to be cleaned comprising a partially circular boundary and obstacles and a cleaning pattern defined accordingly by the robotic cleaning device and the method according to an embodiment of the invention.

Turning now to FIG. 7, which illustrates exemplary another area 28E to be cleaned by the robotic cleaning device 1A, 1B comprising a partially circular area 28E, and some fixed obstacles 34, 34' in the form of a dinner table 34 and a sofa 34'. In an initial phase, while creating or recording the positional data of the area to be cleaned, the robotic cleaning device 1A, 1B recorded the dinner table 34 and the sofa 34' while recording the positional data and thus the layout of the area 28E. Based on the positional data the processing unit 20 defines and generates the cleaning pattern 26E as shown in FIG. 7, taking into account the fixed obstacles 34, 34'. As can be seen, the cleaning pattern 26E is divided in two spiral patterns 27E, 27'E, whereby one of the spiral patterns 27'E is adapted to the half-circular area 28E and around the dinner table 34 and the other spiral pattern 27E is adapted around the sofa 34'. The processing unit 20 defines an imaginary wall, as previously described, in order to separate the two spiral patterns 27E, 27'E. The spiral patterns 27E, 27'E are interconnected by the communication path 32. Since the dinner table 34 will most likely comprise a leg or the like and the robotic cleaning device 1A, 1B is configured to clean around said leg with the aid of the positioning system 4 and the 3D sensor system, respectively, the spiral pattern 27'E covering the part of the area 28E comprising the circular periphery may have a small irregularity as can be seen in FIG. 7. In addition as illustrated in FIG. 7, the robotic cleaning device 1A, 1B will move below the dinner table 34, as indicated by the dashed spiral lines.

Alternatively the processing unit 20 may apply and use a cleaning pattern (not shown) comprising one spiral pattern (not shown) to cover the area 28E shown in FIG. 7, depending on the size and complexity of the room or are 28E to be cleaned.

The processing unit 20 or the decision module may be configured to decide how to split up the map, layout or floor plan, i.e. positional data and thus the cleaning pattern 26A, 26B, 26C, 26D, 26E, 26F, by checking how many double cleaning movements a certain cleaning pattern 26A, 26B, 26C, 26D, 26E, 26F would cause and choose the most effective cleaning pattern 26A, 26B, 26C, 26D, 26E, 26F, whereby double cleaning movements means that a certain region or surface is cleaned twice or more by the robotic cleaning device 1. The processing unit 20 and the decision module may thus be configured and programmed to limit or reduce such double cleaning movements and to establish and generate the cleaning pattern 26A, 26B, 26C, 26D, 26E, 26F accordingly.

Figure 8:
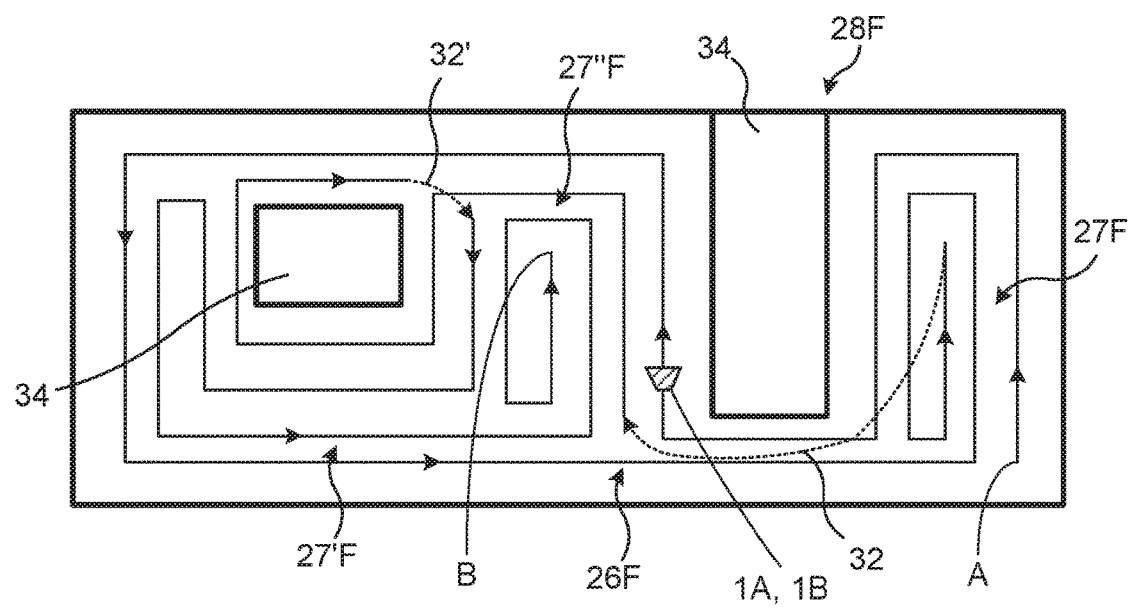
FIG. 8 schematically illustrates a top down view on a further exemplary area to be cleaned comprising a comparably complex layout configured to be cleaned by a cleaning pattern as defined by the robotic cleaning device and the method according to an embodiment of the invention.

FIG. 8 illustrates another more complex area 28F to be cleaned comprising two obstacles (34). The cleaning pattern 26F comprises three spiral patterns 27F, 27'F, 27"F which are partially enlaced with one another. The cleaning pattern 28F illustrated in FIG. 8 illustrates how the processing unit 20 may be configured to optimize the cleaning operation by minimizing double cleaning strokes. The three partially enlaced spiral patterns 27F, 27'F, 27"F are interconnected by communication paths 32, 32'. The robotic cleaning device 1A, 1B recognizes when it is moving on a path that has been cleaned before during the same cleaning operation.

Figure 9:
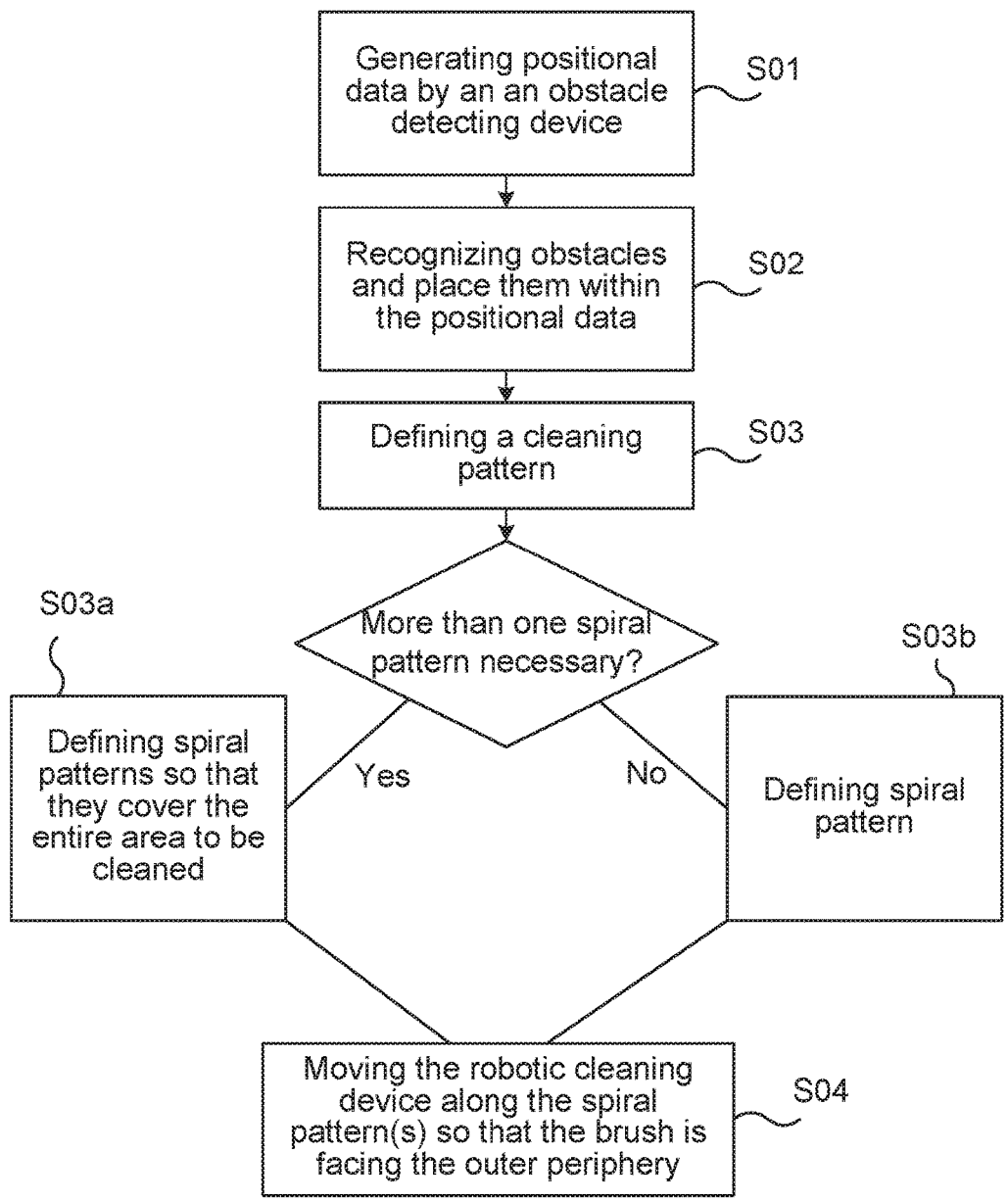
FIG. 9 illustrates a flow chart according to a method of the present invention.

FIG. 9 schematically illustrates a flow chart according to a method of the invention.

The invention has been illustrated by illustrating the robotic cleaning device 1A, 1B having the brush 16 arranged on the right side of the opening 10. However all embodiments and cleaning patterns 26A, 26B, 26C, 26D, 26E, illustrated herein may be easily adapted to a robotic cleaning device 1A, 1B having the brush 16 arranged on a left side of the opening 10.

FIGS. 4 to 8 illustrate examples of areas 28A, 28B, 28C, 28D, 28E, 28F to be cleaned. It falls within the scope of the invention, to clean areas 28A, 28B, 28C, 28D, 28E, 28F comprising other layouts as the ones shown and thus to generate and define other cleaning patterns 26A, 26B, 26C, 26D, 26E, 26F, based on these layouts and thus positional data. The processing unit 20 and the robotic cleaning device 1, respectively, may be adapted accordingly.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic cleaning device comprising:
   a main body;
   an opening arranged in a bottom side of the main body for removing debris from an area to be cleaned;
   a brush arranged adjacent to the opening;
   a propulsion system configured to move the robotic cleaning device across the area; and
   a positioning system comprising an obstacle detecting device configured to detect obstacles and a processing unit, the obstacle detecting device being configured to record positional data;
   wherein the processing unit is configured to:
      generate a cleaning pattern from the positional data, the cleaning pattern having a single spiral pattern,
      determine a number of double cleaning movements the single spiral pattern would cause,
      split up the single spiral pattern into a plurality of spiral patterns to minimize the number of double cleaning movements, each of the spiral patterns having an outer periphery and being arranged so that, during the cleaning, the robotic cleaning device spirals itself inwards from the outer periphery towards a centre of each of the spiral patterns, wherein the brush is arranged to face the outer periphery while the robotic cleaning device follows each of the spiral patterns.

2. The robotic cleaning device according to claim 1, wherein the brush is a rotating brush arranged at a periphery of the body and extending at least partially outside a periphery of the body.

3. The robotic cleaning device according to claim 1, wherein the positional data is recorded while the robotic cleaning device is following a periphery of the area.

4. The robotic cleaning device according to claim 2, wherein the rotating brush is configured to rotate in the same direction as each of the spiral patterns.

5. The robotic cleaning device according to claim 1, wherein the brush is arranged on a horizontally protruding portion of the body.

6. The robotic cleaning device according to claim 1, wherein each of the spiral patterns comprises an angular shaped spiral pattern.

7. The robotic cleaning device according to claim 1, wherein the brush is arranged on a right side of the opening as seen in a direction of movement of the robotic cleaning device and wherein each of the spiral patterns is a left-hand spiral pattern.

8. The robotic cleaning device according to claim 1, wherein the brush is arranged on a left side of the opening as seen in a direction of movement of the robotic cleaning device and wherein each of the spiral patterns is a right-hand spiral pattern.

9. The robotic cleaning device according to claim 1, wherein the cleaning pattern comprises communication paths that interconnect each of the spiral patterns.

10. A method of operating a robotic cleaning device comprising the steps of:
   generating positional data of an area by an obstacle detecting device;
   defining a cleaning pattern from the generated positional data by a processing unit, the cleaning pattern having a single spiral pattern;
   determining a number of double cleaning movements the single spiral pattern would cause;
   splitting up, by the processing unit, the single spiral pattern into a plurality of spiral patterns by minimizing the number of double cleaning movements, each of the spiral patterns having an outer periphery and being arranged so that, during the cleaning, the robotic cleaning device spirals itself inwards from the outer periphery towards a centre of each of the spiral patterns; and
   moving the robotic cleaning device along each of the spiral patterns, the movement being controlled by the processing unit, so that a side brush of the robotic cleaning device is facing an outer periphery of each of the spiral patterns, while the robotic cleaning device is moving along each of the spiral patterns.

11. The method according to claim 10, wherein the positional data is generated by having the robotic cleaning device follow a periphery of the area.

12. The method according claim 10, further comprising recognizing obstacles within the area to be cleaned, recording the obstacles and placing them in within the positional data, and defining the cleaning patterns based on the generated positional data comprising the recorded obstacles.

* * * * *